United States Patent
McKee

(10) Patent No.: US 7,784,491 B2
(45) Date of Patent: Aug. 31, 2010

(54) COVER ON POWER STEERING RESERVOIR ASSEMBLY

(75) Inventor: Luke C McKee, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1256 days.

(21) Appl. No.: 11/338,238

(22) Filed: Jan. 24, 2006

(65) Prior Publication Data

US 2006/0185741 A1    Aug. 24, 2006

Related U.S. Application Data

(60) Provisional application No. 60/655,615, filed on Feb. 22, 2005.

(51) Int. Cl.
*F16K 24/00* (2006.01)
(52) U.S. Cl. .................. 137/587; 220/785; 220/780; 60/584
(58) Field of Classification Search ............... 137/587, 137/583, 800; 220/366.1, 785, 780, 784, 220/562, 564; 60/584
See application file for complete search history.

(56) References Cited

U.S. PATENT DOCUMENTS

| | | | |
|---|---|---|---|
| 3,077,283 A | 2/1963 | Shutt et al. | |
| 3,196,617 A | 7/1965 | Ferrell et al. | |
| 4,150,768 A | * 4/1979 | Maynard, Jr. | 220/784 |
| 4,212,411 A | 7/1980 | Steer | |
| 5,136,847 A | 8/1992 | Zander et al. | |
| 5,347,813 A | 9/1994 | Yanagi et al. | |
| 6,464,097 B1 | 10/2002 | Arlt et al. | |
| 6,668,968 B2 | 12/2003 | Hasegawa et al. | |
| 6,702,136 B2 | 3/2004 | Saygan et al. | |
| 6,736,047 B2 | 5/2004 | Hasegawa | |
| 6,832,662 B2 | 12/2004 | Shimizu et al. | |
| 2002/0139604 A1 | 10/2002 | Nissen et al. | |

FOREIGN PATENT DOCUMENTS

| | | |
|---|---|---|
| EP | 1099614 A2 * | 5/2001 |
| GB | 2 191 179 | 12/1987 |
| JP | 10230197 A * | 9/1998 |

* cited by examiner

*Primary Examiner*—John Rivell
*Assistant Examiner*—Andrew J Rost
(74) *Attorney, Agent, or Firm*—Mark E. Duell; Rankin Hill & Clark LLP

(57) ABSTRACT

A reservoir assembly of a power steering system includes a reservoir tank defining a tank chamber for holding a power steering fluid and an opening fluidly connected to the tank chamber for allowing power steering fluid to be added to the tank chamber. A breathable cap covers the opening and limits passage of power steering fluid thereby. The breathable cap allows airflow between the tank chamber and ambient. A cover is disposed over the breathable cap for preventing contaminants from entering the tank chamber through the breathable cap. The cover includes a disc section and a skirt depending axially from the disc section. The disc section and skirt cover the breathable cap. Legs protrude radially inwardly from the skirt. The legs include a first leg and a second leg which extends radially inwardly a greater amount than the first leg.

19 Claims, 6 Drawing Sheets

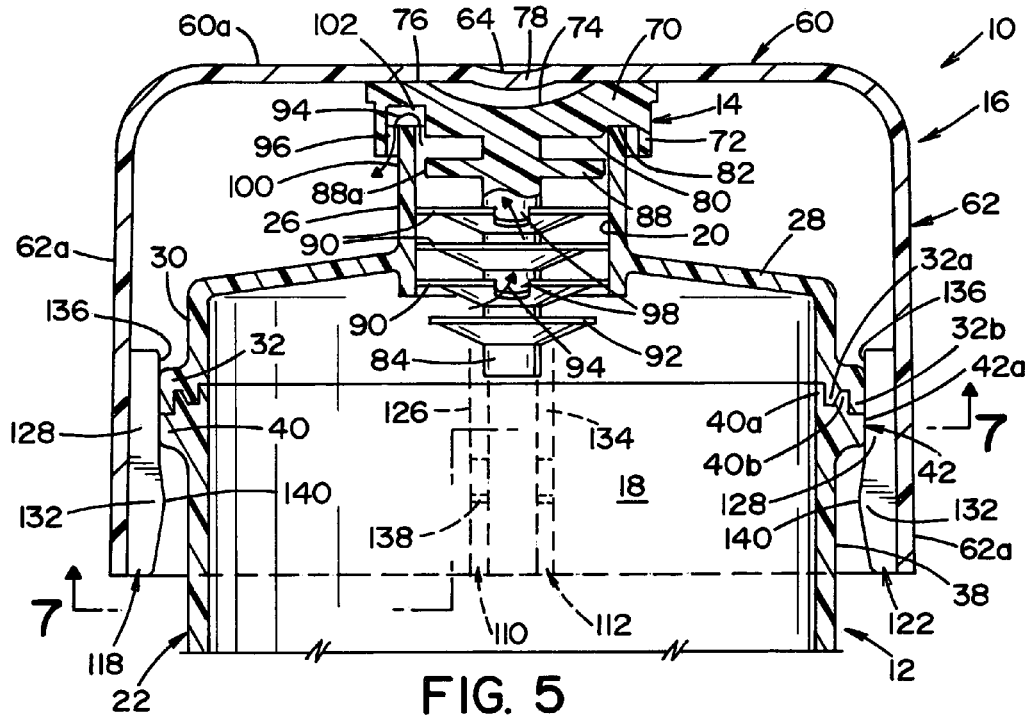

COVER ON POWER STEERING RESERVOIR ASSEMBLY

This application claims the benefit of U.S. Provisional Patent Application Ser. No. 60/655,615, filed Feb. 22, 2005, which is incorporated by reference herein.

BACKGROUND

The present disclosure relates to a power steering reservoir assembly. More particularly, the present disclosure relates to an improved cover of a power steering reservoir assembly and will be described with particular reference thereto. It is to be appreciated, however, that the improved cover may relate to other similar environments and applications.

Generally, a power steering system supplies an assistant steering force to a vehicle's steering system in order to assist a driver in turning the vehicle's steering wheel. Vehicles equipped with power steering systems are in widespread use. In such vehicles, since smooth turning of the steering wheel is enabled by the power steering system, the driver is able to turn the steering wheel with relative ease.

A typical power steering system includes a steering gear, an oil pump, a reservoir tank assembly, hydraulic piping, and a steering wheel. The steering gear is actuated by input from the steering wheel. The oil pump pumps oil (e.g., power steering fluid) through the hydraulic piping to the steering gear. The reservoir maintains a reserve amount of oil in the system so that, as the oil pump runs at different speeds, additional fluid can be delivered to the pump as needed.

Power steering reservoir assemblies can include a tank or receptacle, a breathable cap through which airflow communication is allowed into the tank, and a cover received over the breathable cap to prevent contaminants from entering the reservoir tank. Power steering reservoirs are often subjected to adverse conditions including moisture, dust, abrasives and various other chemicals (i.e., contaminants) that need to be kept out of the reservoir. Contaminants in the power steering oil can cause damage to the hydraulic components of the power steering system and therefore must be prevented or at least limited from entering the fluid reservoir.

In some prior art reservoir assemblies, the cover is snap-fit onto the reservoir tank. Competing factors in designing a reservoir assembly with a snap-fit cover include ease of installation of the cover onto the reservoir and providing a secure snap-fit connection between the cover and the reservoir tank. Over emphasizing one factor, such as providing a secure snap-fit connection, can cause assembly difficulties, particularly in installing the cover onto the reservoir assembly. Any improvements that balance the need to provide a secure snap-fit connection between the cover and the reservoir tank with the desire to ease or facilitate installation of the cover onto the reservoir tank are considered desirable.

BRIEF DESCRIPTION

According to one aspect, a reservoir assembly of a power steering system is provided. More particularly, in accordance with this aspect, the reservoir assembly includes a reservoir tank defining a tank chamber for holding a power steering fluid and an opening fluidly connected to the tank chamber for allowing power steering fluid to be added thereto. A breathable cap covers the opening and limits passage of power steering fluid thereby. The breathable cap allows airflow between the tank chamber and ambient. A cover is disposed over the breathable cap for preventing contaminants from entering the tank chamber through the breathable cap. The cover includes a disc section and a skirt depending axially from the disc section. The disc section and skirt cover the breathable cap. Legs protrude radially inwardly from the skirt. The legs include a first leg and a second leg which extends radially inwardly a greater amount than the first leg.

According to another aspect, a reservoir assembly is provided in a vehicle. More particularly, in accordance with this aspect, the reservoir assembly includes a fluid reservoir adapted to hold a hydraulic fluid and an air opening providing an airflow passage into the fluid reservoir. A cover has a disc section and a skirt together disposed over the air opening. A first set of diametrically opposed legs is radially disposed between the fluid reservoir and the cover skirt. The first set of legs defines a first dimension therebetween prior to installation of the cover onto the fluid reservoir. A second set of diametrically opposed legs is radially disposed between the fluid reservoir and the cover skirt. The second set of legs is radially offset relative to the first set of legs and defines a second dimension therebetween that is less than the first dimension prior to installation of the cover onto the fluid reservoir.

According to yet another aspect, a reservoir assembly is provided. More particularly, in accordance with this aspect, the reservoir assembly includes a reservoir holding a working fluid and a cover received on the reservoir. The cover includes a generally planar section and at least one wall section depending from the generally planar section. A first set of opposed legs includes legs extending from the at least one wall section toward one another. A first dimension is defined between the first set of opposed legs prior to assembly of the cover onto the reservoir. A second set of opposed legs includes legs extending from the at least one wall section toward one another. A second dimension is defined between the second set of opposed legs prior to assembly of the cover onto the reservoir that is less than the first dimension. An interference fit is formed between the first and second sets of opposed legs and an outer surface of the reservoir when the cover is assembled onto the reservoir.

BRIEF DESCRIPTION OF THE DRAWINGS

FIG. 5 is a cross-sectional view of the assembled power steering reservoir assembly taken along the line 5-5 of FIG. 3.

FIG. 6 is a cross-sectional view of the assembled power steering reservoir assembly taken along the line 6-6 of FIG. 3.

DETAILED DESCRIPTION

Figure 1:
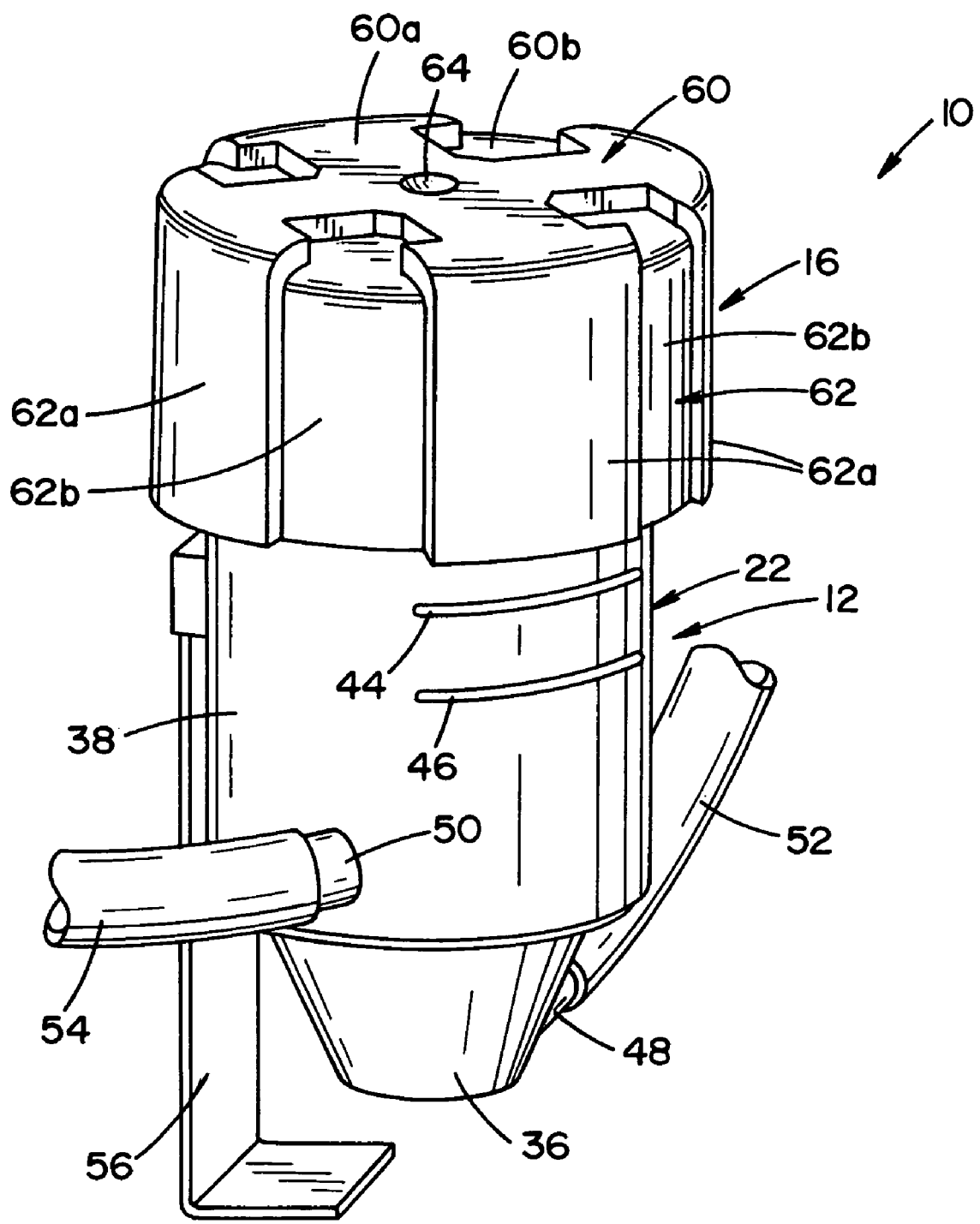
FIG. 1 is a perspective view of a power steering reservoir assembly having a tank and a cover installed on the tank.
Figure 2:
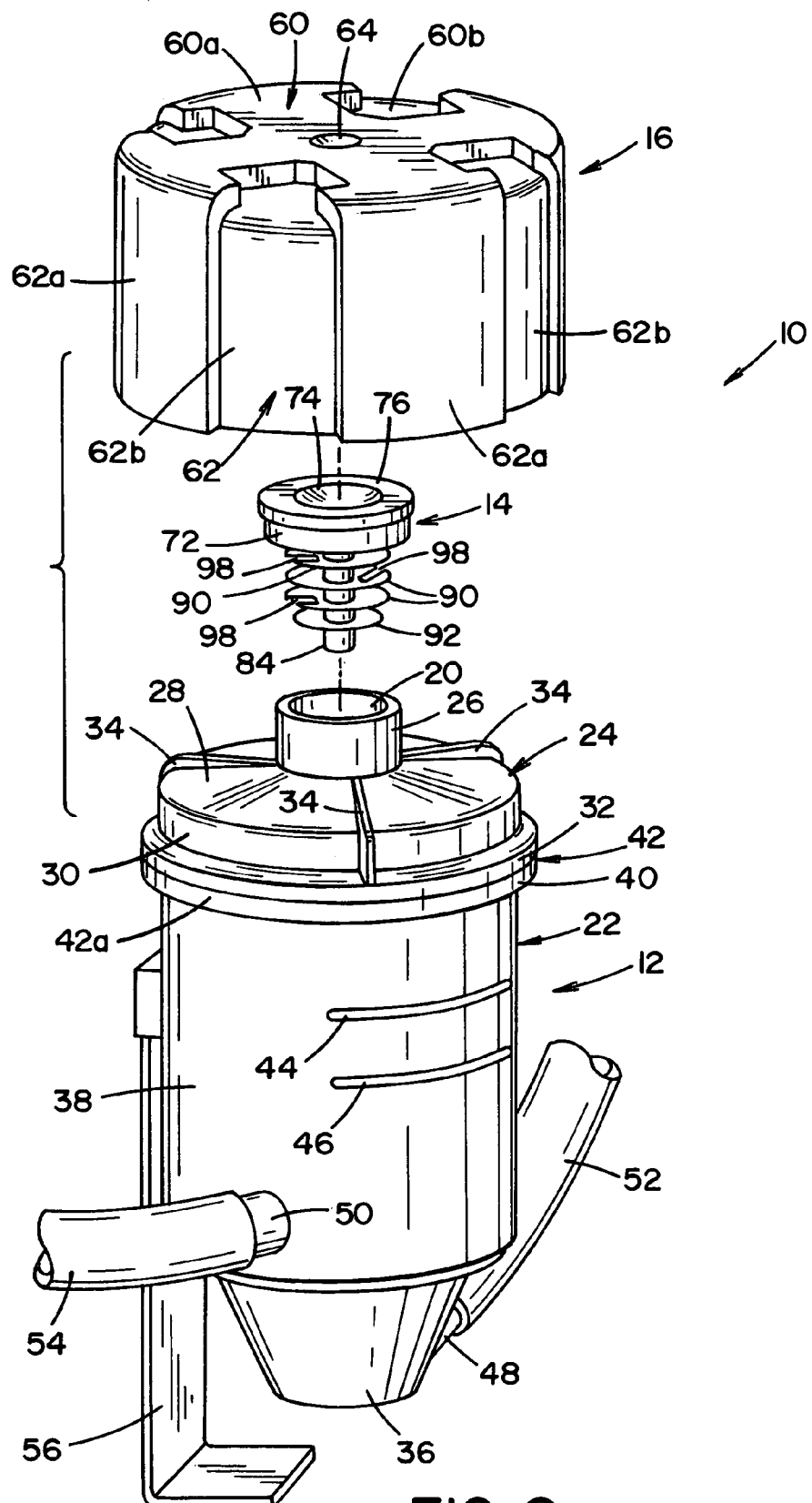
FIG. 2 is an exploded perspective view of the power steering reservoir assembly showing a breathable cap of the reservoir assembly.

Referring now to the drawings wherein the showings are for purposes of illustrating one or more embodiments only and not for purposes of limiting the same, FIGS. 1 and 2 show a reservoir assembly generally designated by the reference numeral 10. The reservoir assembly 10 includes a reservoir tank 12, a breathable cap 14 and a cover 16 disposed over the breathable cap 14 for preventing contaminants, such as water, dirt, grease, etc., from entering the tank 12 through the breathable cap 14.

In the illustrated embodiment, the reservoir tank 12 defines a tank chamber 18 (FIG. 5) suitable or adapted for holding a fluid, such as a hydraulic or other working fluid. The tank 12 defines a tank opening 20 fluidly connected to the tank chamber 18 for allowing additional fluid to be added to the reservoir tank 12 and, more specifically, the reservoir tank chamber 18. As will be understood and appreciated by those skilled in the art, the reservoir assembly 10 can be provided as a component in a vehicle's power steering system (i.e., the reservoir assembly 10 could be fluidly connected to or within a power steering system of a vehicle), in which case the fluid contained in the tank 12 could be a power steering fluid.

The breathable cap 14 is received/disposed in and covers the opening 20 thereby at least limiting the passage of fluid held in the tank 12 from passing thereby. As will be described in more detail below, the breathable cap 14 does allow airflow between the tank chamber 18 and ambient or atmosphere. This allows the fluid in the tank 12 to more easily expand and contract. Upon an expansion and/or increase of the fluid in the tank 12, air is forced out of or purged from the tank chamber 18 through the breathable cap 14. Upon a contraction or reduction of the fluid in the tank chamber 18, air is drawn into the chamber 18 through the breathable cap 18.

In the illustrated embodiment, the tank 12, also referred to herein as a fluid reservoir, is formed of a lower receptacle or cup 22 and a lid 24 which closes an open end of the cup. Together, the cup 22 and the lid 24 form or define the chamber 18. The lid 24 includes a port section 26 which defines the opening 20 at one end thereof, a radial section 28 surrounding the port section 26, and a skirt 30 depending from a circumference of the radial section. A rib portion 32 is disposed distally on the lid skirt 30 relative to the radial section 28. Additionally, stiffening ribs 34, which are circumferentially spaced apart and extend radially from the port portion 26 through the skirt 30, can be provided on the lid 24.

The cup 22 includes a frustoconical base 36 and a cylindrical wall section 38 extending from the base 36 and terminating at a rib portion 40 (i.e., the rib portion 40 is distally disposed on the cylindrical section 38 relative to the base 36). The cylindrical wall section 38 and the skirt 30 of the lid 24 together form an outer cylindrical surface 30,38 of the tank 12. The rib portion 40 and the rib portion 32 of the lid 24 together form a tank rib 42 which is formed as part of the tank outside surface, but protrudes radially from the skirt and wall section. With brief reference to FIG. 5, both rib portions 32,40 include alternating protrusions or teeth 32a,32b and 40a,40b that interlock with one another. In one embodiment, the rib portions 32,40 are spun weld to form a fused joint between the lid 24 and the cup 22 thereby forming the tank 12 into a unitary or integral structure.

Returning to FIGS. 1 and 2, the cup 22 can be formed of a translucent or transparent material in one embodiment so the level of the fluid held or received in the cup can be readily determined from outside the reservoir tank 12. The cylindrical section 38 can include marking indicators, such first and second fluid level indicators 44,46, that can be compared to the level of fluid in the tank 12 for determining if there is too much or too little fluid in the tank. For example, the fluid indicators 44,46 can correspond, respectively, to a cold or minimum fill location and a warm or maximum fill location.

The tank 12 can further include ports 48,50 for fluidly communicating with other components of the system in which the reservoir assembly 10 is employed. In the illustrated embodiment, a first or delivery port 48 extends from the base 36 and a second or return port 50 extends from the cylindrical section 38. In a power steering system, the delivery port 48 can fluidly communicate through hose 52 and deliver power steering fluid from the tank 12 to an associated power steering pump. The return port 50 can fluidly communicate through hose 54 for receiving power steering fluid from the associated power steering pump. A support bracket 56 can be provided for securely mounting the reservoir tank 12 in a vehicle, such as within an associated engine compartment of the vehicle, as is known to those skilled in the art.

Figures 3, 4:
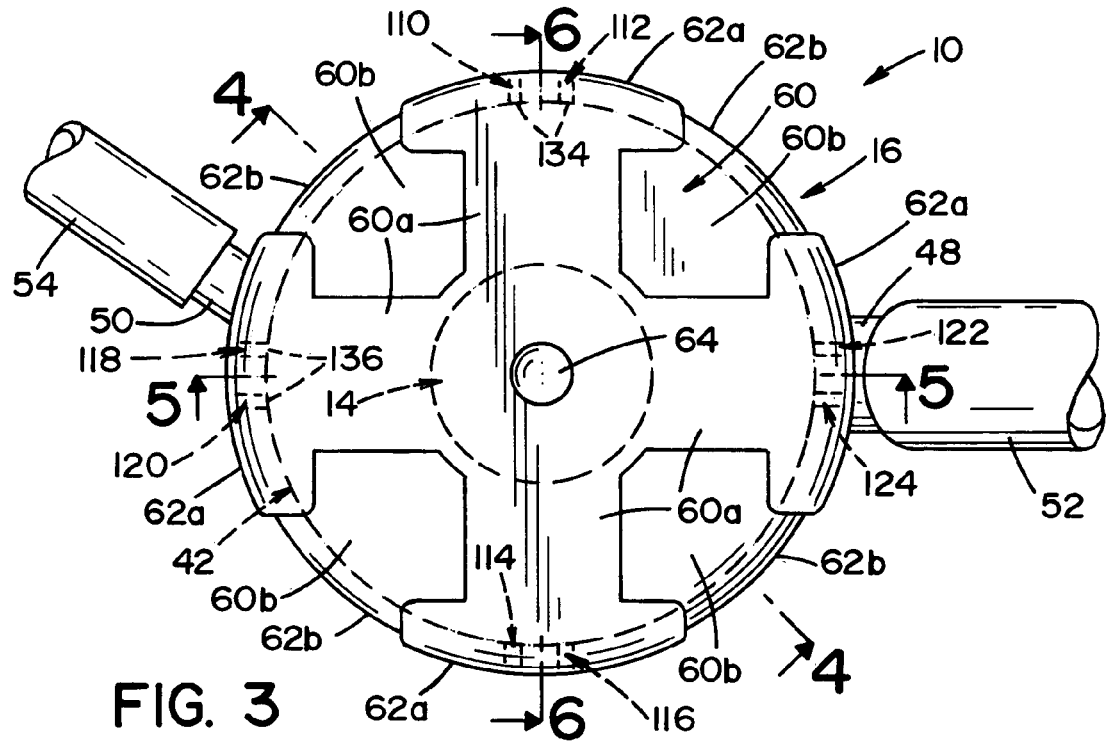
FIG. 3 is a top plan view of the assembled power steering reservoir assembly.
FIG. 4 is a cross-sectional view of the cover taken along the line 4-4 of FIG. 3 installed on the tank and an elevational view of the tank and breathable cap (partially in cross-section).

With additional reference to FIGS. 3 and 4, the illustrated cover 18 includes a generally planar or radially extending section 60 and at least one wall section 62 depending from the generally planar section 60. In the illustrated embodiment, the generally planar or radial section 60 is a disc or disc-shaped section and the at least one wall section 62 is an axially depending cylindrical skirt that extends from about a circumference of the disc section 60. The cover 16, and more specifically the cover's disc section 60 and/or skirt 62, are received on the tank 12 and cover the breathable cap 14. In the illustrated embodiment, the disc section 60 and the skirt 62 are unitarily formed and comprise a plurality of embossments circumferentially spaced about the cover 16 (i.e., alternating raised and lowered areas). The plurality of embossments can function to increase the rigidity and/or the strength of the cover 16. It is to be appreciated by those skilled in the art that the cover 16 can have a variety of alternate configurations suitable for covering the breathable cap 14.

The plurality of raised embossments of the illustrated embodiment include T-shaped portions 60a on the disc section 60 and rectangular-shaped portions 62a on the skirt 62. The T-shaped raised portions 60a delineate or frame lowered portions 60b on the disc section 60 and the portions 62a delineate or frame rectangular-shaped lowered portions 62b on the skirt 62. More particularly, the T-shaped portions 60a have respective bases formed integrally with one another and respective tops adjacent the skirt 62. A recess or dimple 64 is defined centrally on the cover 16 and approximately at a location where the respective T-shaped portions 60a meet.

As illustrated in FIG. 3, the cover's skirt 62, including the lowered portions 62b, is generally spaced apart, radially in the illustrated embodiment, from the tank 12. More particularly, the skirt 62 and its lowered portions 62b are spaced apart from the tank 12, including the outer surface 30,38 thereof and the protruding rib 42 extending therefrom. As will be described in more detail below, the cover 16 additionally includes a plurality of legs (110-124) extending or protruding radially inwardly from the cover's skirt 62 for securing the cover to the tank 12.

With reference now to FIGS. 2-6, the breathable cap 14 includes a radial section 70 capable of extending across the tank opening 20 and a flange 72 depending from the radial section 70 capable of fitting around the port section 26 of the tank 12. The radial section 70 includes a recess 74 in an upper surface 76 that is sized to receive the dimple 64. Specifically, the recess 74 receives a portion 78 of the cover's radial section 60 protruding downward toward the tank opening 20. The radial section 70 further includes a raised section 80 in an lower surface 82 (i.e., a surface that faces the opening 20 and rests against the port section 26) that fits partially within the opening 20 of the tank 12.

The cap 14 also includes a stem 84 extending from the radial section 70 and, in the illustrated embodiment, for extending into the opening 20 at least the length of the port section 26. Axially disposed along the stem 84 are a plurality of radial flanges, including main flange 88 adjacent the radial section 70, three port flanges 90 and distal flange 92. The flanges 88,90,92 are axially spaced along the stem 84. The main flange 88 and the port flanges 90 are approximately the same diameter as the port opening 20 and, together with the radial section 70, serve to each close the opening 20.

A circuitous airflow passage (illustrated schematically by arrows 94 in FIG. 5) allows airflow communication between the tank chamber 18 and ambient or atmosphere. The circuitous path of the airflow passage 94 allows airflow communication, but prevents fluid received in the tank 12 from easily escaping. In the illustrated embodiment, the airflow passage 94 is defined through the port flanges 90, through the main flange 88, and through an air opening 96 to ambient. As shown, the cover 16 and, more particularly, the cover's radial section 60 and the cover's skirt 62 are together disposed over the air opening 96 to prevent contaminants from easily entering the tank 12.

More specifically, each of the port flanges 90 includes a notched recess 98 that allows airflow to pass therethrough. The notched recesses 98 are oriented one-hundred and eighty degrees (180°) relative to one another on adjacent port flanges 90. Thus, the notches 98 on the lowest port flange 90 and the uppermost port flange 90 are aligned with one another. The main flange 88 includes a flat portion 88a that allows the airflow passage 94 thereby. The air opening 96 is defined by the flange 72 and an outer surface 100 of the port section 26, as well as through a recess 102 of the radial section 70.

With reference now to FIGS. 5-8, the plurality of legs of the cover 16 includes sets of opposed legs. More particularly, in the illustrated embodiment, the cover 16 includes a first set of diametrically opposed legs 110,112,114,116 and a second set of diametrically opposed legs 118,120,122,124, wherein each of the first and second sets of legs includes two pairs of adjacent legs extending from the cover's skirt 62 toward one another. Specifically, the first set of opposed legs includes a first adjacent pair of legs 110,112 and a second pair of legs 114,116 diametrically opposed to the first pair of legs 110, 112. The second set of opposed legs includes a first adjacent pair of legs 118,120 and a second pair of legs 122,124 diametrically opposed to the second set first pair of legs 118,120. In the illustrated embodiment, the first and second sets of diametrically opposed legs 110-116 and 118-124 are oriented or radially offset approximately ninety degrees relative to one another. All the legs 110-124 extend from raised portions 62a of the skirt 62.

The first set of legs, including leg pairs 110,112 and 114, 116, includes first legs all of a specified radial dimension. The first legs 110,112,114,116 are radially disposed between the tank 12 and the cover skirt 62 when the cover 16 is received on the tank. The second set of legs, including leg pairs 118,120 and 122,124, includes second legs all of a specified radial dimension that is greater than that of the first legs 110-116. Like the first legs, the second legs 118,120,122,124 are radially disposed between the tank 12 and the cover skirt 62 when the cover 16 is received on the tank. Having a greater radial dimension, each of the second legs 118-124 extends radially inwardly from the skirt 62 a greater amount or distance than the first legs 110-116 (e.g., compare FIGS. 5 and 6).

Figure 7:
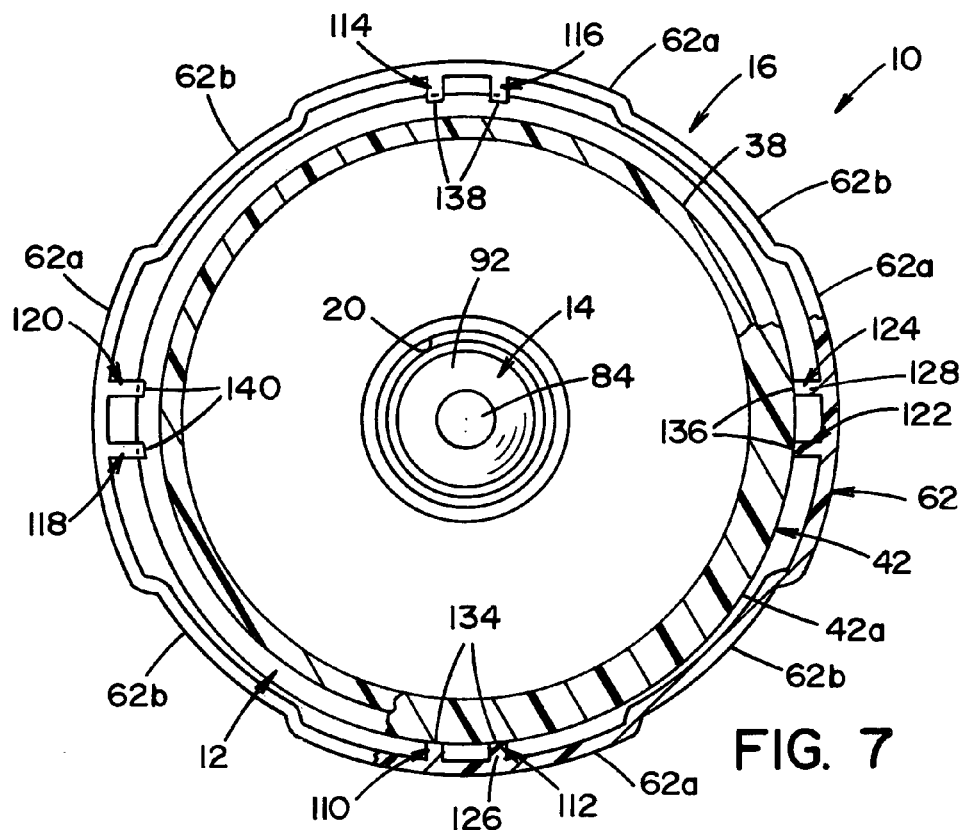
FIG. 7 is a cross-sectional view of the assembled power steering reservoir assembly taken along the line 7-7 of FIG. 5.

A first dimension or diameter is defined between opposed pairs of first legs 110,112 and 114,116 and a second dimension or diameter is defined between opposed pairs of second legs 118,120 and 122,124. Prior to installation of assembly of the cover 16 onto the tank 12, the second dimension or diameter is less than the first dimension diameter. More particularly, prior to installation of the cover 16 onto the tank 12, the second diameter, defined between leg pairs 118,120 and 122, 124, is smaller or less than the diameter of the tank 12 (and specifically the tank outer surface 30,38 which includes the rib 42). The first diameter, defined between leg pairs 110,112 and 114,116, is larger or greater than the diameter of the tank 12, including tank outer surface 30,38 and rib 42, prior to installation of the cover 16 onto the tank 12. It is to be understood that in the illustrated embodiment the cover 16, and particularly the cover skirt 62, is round or circular prior to being installed on the tank 12. As will be described below in more detail, the first and second dimensions are altered when the cover 16 is installed on the tank 12 such that the first and second dimensions match an outer diameter of the tank and an interference fit is formed between all the legs 110-124 and the tank 12 (as shown in FIGS. 5-7).

The first and second legs 110-124 of the illustrated embodiment all include respective tank engaging portions (126 on the first legs and 128 on the second legs) and axial pullout prevention portions (130 on the first legs and 132 on the second legs). The tank engaging portions 126,128 include respective engaging edges or surfaces, including first leg engaging surfaces 134 and second leg engaging surfaces 136, for contacting the tank 12. In the illustrated embodiment, the engaging surfaces 134,136 are elongated axially relative to the cover 16 and tank 12 and are generally parallel with a raised surface 42a of the rib 42. The first diameter defined between opposed pairs of first legs 110,112 and 114,116 is specifically defined between opposed first leg engaging surfaces 134 of the first leg engaging portions 126. Similarly, the second diameter is specifically defined between opposed second leg engaging surfaces 136 of the second leg engaging portions 128.

The engaging surfaces 134,136 are axially oriented so as to be aligned with the rib 42 in a radial plane when the cover 16 is fully installed (i.e., received on) the tank 12. Each of the axial pullout prevention portions 130,132 includes an area or surface, including first leg surface 138 and second leg surface 140, that extends radially inwardly beyond respective first and second leg engaging surfaces 134,136. As illustrated, the areas or surfaces 138,140 are axially offset from the engaging surfaces 134,136 so as to be offset relative to the rib 42 and the radial plane defined therethrough when the cover 16 is on the tank 12. This allows the areas or surfaces 138,140 to extend radially inwardly beyond the rib surface 42a on a lower side of the rib 42. In the illustrated embodiment, the surfaces 138,140 extend beyond the rib surface 42a when the legs 110-124 engage the rib 42 and the tank 12 after installation of the cover 16 onto the tank. This prevents or at least further limits removal of the cover 16 from the tank 12 because the surfaces 138,140 are obstructed by the rib 42.

Figure 8:
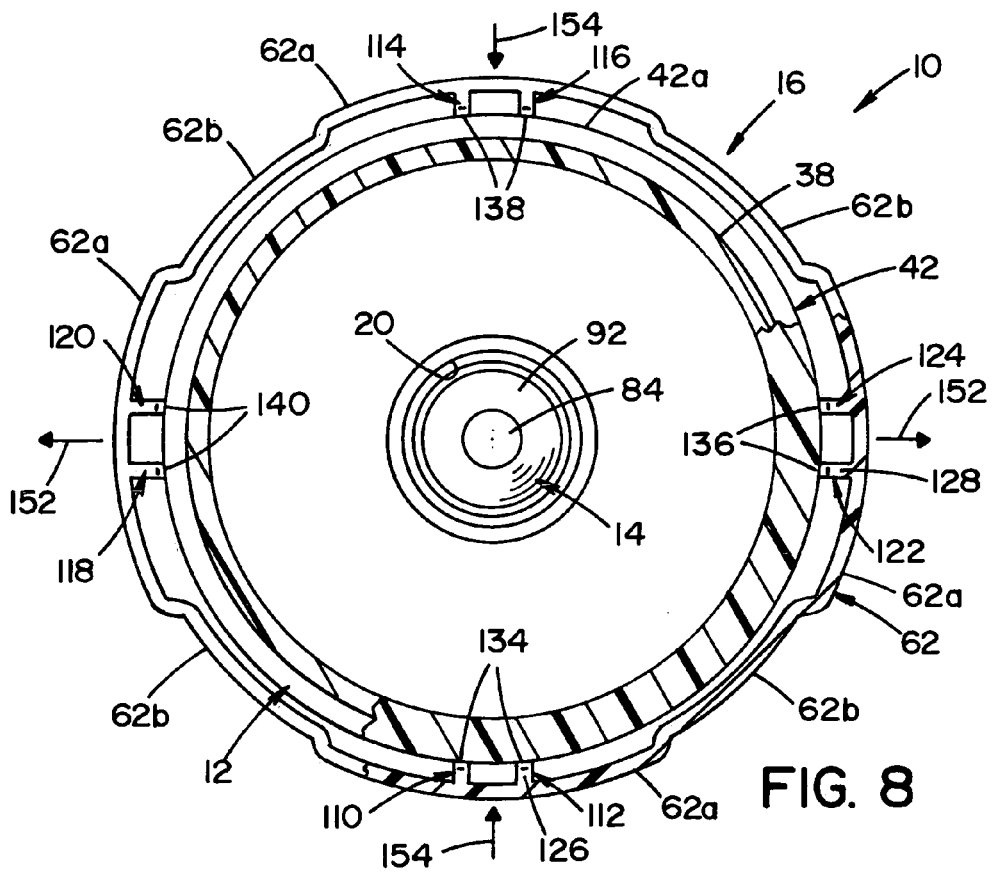
FIG. 8 is a cross-sectional view of the power steering reservoir assembly of FIG. 7 schematically showing the cover being installed onto the tank.

With reference to FIG. 8, installation of the cover onto the tank 16 will be described. Due to the radial dimensioning of the legs 110-124 of the cover 16, when the cover 16 is installed on the tank 12, the second legs 118-124 (which are longer than the first legs 110-116) are forced to move radially outward (as indicated by arrows 152). The second legs 118-124 are forced outward by their engagement with the tank rib 42 during installation of the cover onto the tank 12. Due to the resiliency of the lid 16, when the second legs 118-124 are forced radially outward, the first legs 110-116 contract and move radially inward (as indicated by arrows 154) and also engage the rib 42. Similarly, portions of the skirt 62 adjacent the second legs 118-124 move radially outward with the second legs 118-124, while portions of the skirt 62 adjacent the first legs 110-116 move radially inward with the first legs 110-116. Thus, as the cover 16 is installed, radial expansion of the second legs 118-124 causes the second dimension or diameter to expand and radial contraction of the first legs 110-116 causes the first dimension or diameter to contract, both to the diameter of the tank 12. Once the cover 16 is fully installed on the tank 12, with all legs 110-124 engaging the tank 12, the cover 16 is slightly oblong or elliptical in shape and securely connected to the tank 12.

As best shown in FIG. 8, movement of the first legs 110-116 radially inward causes first leg surfaces 138 to extend radially beyond the rib surface 42a and thus the first legs 110-116 limit axial removal of the cover 16 from the tank 12 in combination with the second legs 118-124. Moreover, as the first legs 110-116 contract, a second interference fit is formed between the first legs and the cover 16. By expansion of one set of legs 118-124 with simultaneous contraction of a radially offset set of legs 110-116, the cover 16 remains secured to the tank 12.

Figure 9:
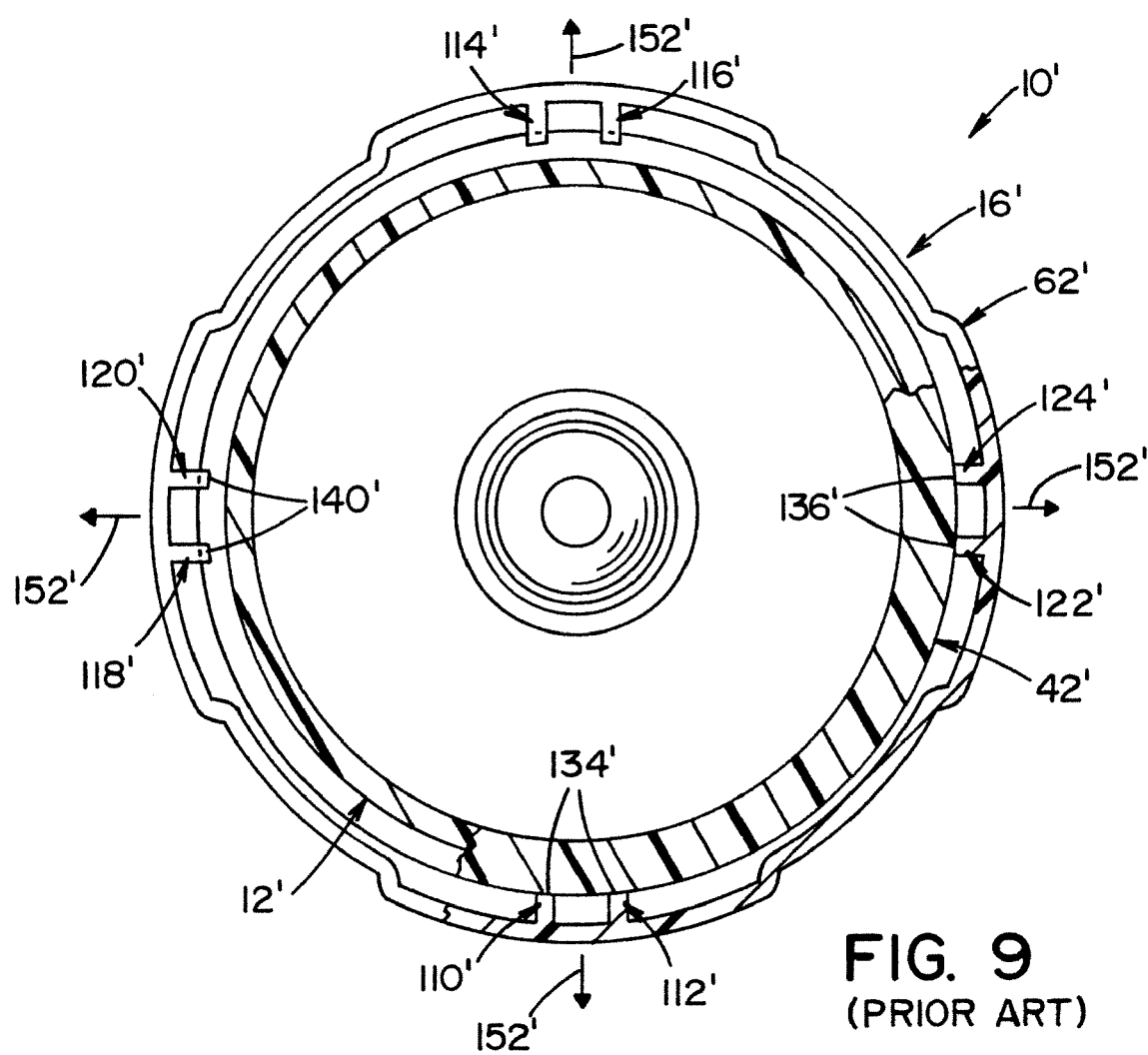
FIG. 9 is a cross-sectional view of a prior art power steering reservoir assembly schematically showing the cover being installed onto the tank.

In contrast, with reference to FIG. 9, a prior art reservoir assembly 10' has matching legs 110', 112', 114', 116', 118', 120', 122', 124' all extending radially the same amount or dimension from cover 16' toward tank 12'. Opposed sets of legs 110'-124' all define a same dimension or diameter, even prior to installation of the cover 16' on the tank 12', that is less than a tank 12' or rib 42' diameter. Thus, all the identical legs 110'-124' contact or engage rib 42' of the tank 12' when the cover 16' is initially installed onto the tank 12'. More particularly, when the cover 16' is being installed or secured onto the tank 12', the legs' engaging surfaces 134',136' all engage rib 42' of the tank 12' and are forced, together with the skirt 62', to expand radially outward in all directions as indicated by arrows 152'. This can be difficult and can render installation of the cover 16' on to the tank 12' a very difficult task.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A reservoir assembly of a power steering system, comprising:
    a reservoir tank defining a tank chamber for holding a power steering fluid and an opening fluidly connected to said tank chamber for allowing power steering fluid to be added thereto;
    a breathable cap covering said opening and limiting passage of power steering fluid thereby, said breathable cap allowing airflow between said tank chamber and ambient;
    a cover disposed over said breathable cap for preventing contaminants from entering said tank chamber through said breathable cap, said cover including:
        a disc section and a skirt depending axially from said disc section, said disc section and skirt covering said breathable cap, and
        legs protruding radially inwardly from said skirt, said legs including a first leg and a second leg which extends radially inwardly a greater amount than said first leg, wherein, during installation of said cover onto said fluid reservoir, said skirt moves radially outward adjacent said second leg and said skirt moves radially inward adjacent said first leg.

2. The reservoir assembly of claim 1 wherein said legs include a first set of diametrically opposed legs and a second set of diametrically opposed legs, said first set including said first leg and said second set including said second leg.

3. The reservoir assembly of claim 2 wherein said first set of legs are radially offset by about ninety degrees relative to said second set of legs.

4. The reservoir assembly of claim 2 wherein said first and second sets of legs each include adjacent pairs of diametrically opposed legs.

5. The reservoir assembly of claim 1 wherein each of said legs includes a tank engaging portion and an axial pullout prevention portion.

6. The reservoir assembly of claim 5 wherein said tank engaging portion of said first and second legs engages a rib protruding from an outer surface of said tank when the cover is installed on the tank and said axial pullout prevention portion of said first and second legs extends radially inwardly beyond said rib on a lower side of said rib.

7. The reservoir assembly of claim 6 wherein said second leg moves radially outward and said first leg moves radially inward when said cover is installed on said reservoir tank.

8. The reservoir assembly of claim 1 wherein said tank includes an outer cylindrical surface and a rib protruding radially outwardly from said outer cylindrical surface, said first and second legs contacting said rib in a radial plane parallel to said rib when said cover is assembled onto said fluid reservoir.

9. The reservoir of claim 8 wherein said legs include a tank engaging portion and an axial pullout prevention portion, said tank engaging portion of said first and second legs contacting said rib in said plane and said axial pullout prevention portion of said first and second legs extending to a position radially inward relative to a raised surface of said rib and axially offset relative to said tank engaging portion.

10. The reservoir assembly of claim 1 wherein said reservoir tank includes delivery port portion fluidly connecting said tank chamber to a delivery hose for delivering power steering fluid in said tank chamber to an associated power steering pump and a return port portion fluidly connecting said tank chamber to a return hose for receiving power steering fluid from the associated power steering pump.

11. The reservoir assembly of claim 1 wherein said reservoir tank includes a first indicator corresponding to a cold or minimum fill location and a second indicator corresponding to a warm or maximum fill location.

12. The reservoir assembly of claim 1 further including a bracket that mounts said reservoir tank within an associated engine compartment of a vehicle.

13. A reservoir assembly in a vehicle, comprising:
    a fluid reservoir adapted to hold a hydraulic fluid;
    an air opening providing an airflow passage into said fluid reservoir;
    a cover having a disc section and a skirt together disposed over said air opening;
    a first set of diametrically opposed legs radially disposed between said fluid reservoir and said cover skirt, said first set of legs defining a first dimension therebetween prior to installation of said cover onto said fluid reservoir; and
    a second set of diametrically opposed legs radially disposed between said fluid reservoir and said cover skirt; said second set of legs radially offset relative to said first set of legs and defining a second dimension therebetween that is less than said first dimension prior to installation of said cover onto said fluid reservoir, wherein, during installation of said cover onto said fluid reservoir, said second dimension expands to match said fluid reservoir and said first dimension contracts to match said fluid reservoir.

14. The reservoir assembly of claim 13 wherein said second dimension is smaller than a diameter of said fluid reservoir so as to provide an interference fit between said fluid reservoir and said second set of legs.

15. The reservoir assembly of claim 13 further including a cap disposed in a fluid opening defined in said fluid reservoir, said air opening at least partially defined in said cap or between said cap and said fluid reservoir.

16. The reservoir assembly of claim 13 wherein said fluid reservoir is fluidly connected to a power steering system of the vehicle.

17. A reservoir assembly, comprising:
a reservoir holding a working fluid;
a cover received on said reservoir, said cover including a generally planar section and at least one wall section depending from said generally planar section;
a first set of opposed legs includes legs extending from said at least one wall section toward one another, a first dimension defined between said first set of opposed legs prior to assembly of said cover onto said reservoir;
a second set of opposed legs includes legs extending from said at least one wall section toward one another, a second dimension defined between said second set of opposed legs prior to assembly of said cover onto said reservoir that is less than said first dimension; and
an interference fit formed between said first and second sets of opposed legs and an outer surface of said reservoir when said cover is assembled onto said reservoir, wherein said first dimension contracts and said second dimension expands when said cover is assembled onto said reservoir, whereby the cover is slightly oblong or elliptical in shape.

18. The reservoir assembly of claim 17 wherein said generally planar section is disc-shaped, said at least one wall section is formed as a cylindrical skirt and said reservoir has a cylindrical outer surface.

19. The reservoir assembly of claim 17 wherein said working fluid is power steering fluid and said reservoir is fluidly connected to a power steering system of a vehicle.

* * * * *